(12) United States Patent
Foley et al.

(10) Patent No.: US 9,419,871 B2
(45) Date of Patent: Aug. 16, 2016

(54) METHOD AND SYSTEM FOR REMOTELY MONITORING DEVICE STATUS AND INTERNET CONNECTIVITY ON A COMPUTER NETWORK

(71) Applicant: Vector Unlimited, LLC, Memphis, TN (US)

(72) Inventors: Kevin Thomas Foley, Germantown, TN (US); William Scott Fuelling, Cordova, TN (US); Jesse James Johns, Memphis, TN (US); Daniel Paul Lapoint, Memphis, TN (US)

(73) Assignee: VECTOR UNLIMITED, LLC, Memphis, TN (US)

( * ) Notice: Subject to any disclaimer, the term of this patent is extended or adjusted under 35 U.S.C. 154(b) by 214 days.

(21) Appl. No.: 14/215,480

(22) Filed: Mar. 17, 2014

(65) Prior Publication Data

US 2014/0280920 A1 Sep. 18, 2014

Related U.S. Application Data

(60) Provisional application No. 61/787,137, filed on Mar. 15, 2013.

(51) Int. Cl.
| | |
|---|---|
| *G06F 15/173* | (2006.01) |
| *H04L 12/26* | (2006.01) |
| *G06F 11/263* | (2006.01) |
| *H04L 12/24* | (2006.01) |
| *H04L 29/06* | (2006.01) |

(52) U.S. Cl.
CPC ........ *H04L 43/0811* (2013.01); *H04L 41/0672* (2013.01); *H04L 43/0817* (2013.01); *G06F 11/2635* (2013.01); *H04L 12/2697* (2013.01); *H04L 29/06* (2013.01); *H04L 41/082* (2013.01); *Y04S 40/166* (2013.01); *Y04S 40/168* (2013.01)

(58) Field of Classification Search
CPC ... H04L 29/06; H04L 41/082; H04L 12/2697; G06F 11/2635
USPC .................................................. 709/223, 224
See application file for complete search history.

(56) References Cited

U.S. PATENT DOCUMENTS

| | | | | |
|---|---|---|---|---|
| 8,204,990 B1 * | 6/2012 | Avery | ................ | H04L 12/4625 307/112 |
| 2005/0193225 A1 * | 9/2005 | Macbeth | ............ | G06F 11/0709 714/2 |
| 2006/0010251 A1 * | 1/2006 | Mrsic-Flogel | ...... | H04L 12/1822 709/245 |
| 2006/0209852 A1 * | 9/2006 | Wakumoto | .............. | H04L 45/02 370/401 |
| 2008/0091819 A1 * | 4/2008 | Yang | ................... | H04L 12/2697 709/224 |
| 2009/0013210 A1 * | 1/2009 | McIntosh | ............ | H04L 12/2697 714/4.1 |
| 2012/0124009 A1 * | 5/2012 | Eshel | ................ | G06F 17/30085 707/689 |
| 2012/0215880 A1 * | 8/2012 | Lamba | .................. | H04L 67/142 709/217 |
| 2013/0042115 A1 * | 2/2013 | Sweet | ................ | H04L 63/0428 713/176 |
| 2013/0124730 A1 * | 5/2013 | Buerk | ..................... | H04L 69/28 709/225 |
| 2014/0189351 A1 * | 7/2014 | Steely | .................. | H04L 9/0825 713/168 |

\* cited by examiner

*Primary Examiner* — Hieu Hoang
(74) *Attorney, Agent, or Firm* — Nixon & Vanderhye PC

(57) ABSTRACT

A method and system are disclosed for remotely monitoring devices and Internet connectivity on a computer network. The method uses and the system includes at least two units, i.e., a monitoring station, which is a client device local to the network being monitored, and a centralized server which receives status updates and configuration requests from the monitoring station.

33 Claims, 9 Drawing Sheets

FIGURE 8

METHOD AND SYSTEM FOR REMOTELY MONITORING DEVICE STATUS AND INTERNET CONNECTIVITY ON A COMPUTER NETWORK

This application claims the benefit of U.S. Provisional Application No. 61/787,137, filed Mar. 15, 2013, the entire contents of which are incorporated herein by reference.

BACKGROUND OF THE INVENTION

The present invention relates to computer networks, and more particularly, to a method and system for remotely monitoring network devices' status and Internet connectivity on a local network.

BRIEF DESCRIPTION OF THE INVENTION

The present invention relates to a method and system for remotely monitoring devices and Internet connectivity on a computer network, such as a local area network. Computer networks also include, for example, wide area networks, wireless networks, personal area networks, etc. The method and system utilize at least one remote monitoring station on the local computer network communicating to a centralized server. The communication stream is initiated by the remote monitoring station, allowing reporting to be provided to the centralized server and for queued commands on the server to be retrieved by the monitoring station without secondary or remote penetration of the local network by the central server. The central server is capable of receiving updates and requests from the monitoring station over the Internet. The remote monitoring station is capable of performing network and Internet monitoring and power cycling actions on the local computer network without an active connection to the central server.

The monitoring station automatically queries local network devices via any compatible network protocol to determine their local computer network connectivity and latency. The monitoring station, upon determining that a device is unresponsive, initiates a power cycle of the device via a command sent to a networked power distribution unit. The connected devices are reset through the power distribution unit(s) that can utilize any form of command inputs such as IP, contact closure, relay, IR commands, etc. The monitoring station reports local network devices' status via a network connection back to the central server at timed intervals.

The monitoring station also attempts network connection to various Internet sites to determine Internet connectivity and Internet latency. If the monitoring station determines that Internet connectivity has been lost, the monitoring station power-cycles the internet connection equipment via a command to networked power units supplying the internet connection equipment. This process is automated. A power cycle or command may also be initiated from the central server and is held in queue until the monitoring station performs its synchronization request. If power cycles or commands are queued, they are included in the response from the centralized server to the monitoring station's request. The monitoring station executes the power cycles or commands as part of its synchronization routine.

When the monitoring station determines that Internet connectivity has been regained after being lost, the monitoring station reports the time and duration of the lost connectivity back to the centralized server via a network connection.

DETAILED DESCRIPTION OF THE INVENTION

The present invention relates to a method and system for remotely monitoring devices and Internet connectivity on a computer network, such as a local area network.

Figure 1:
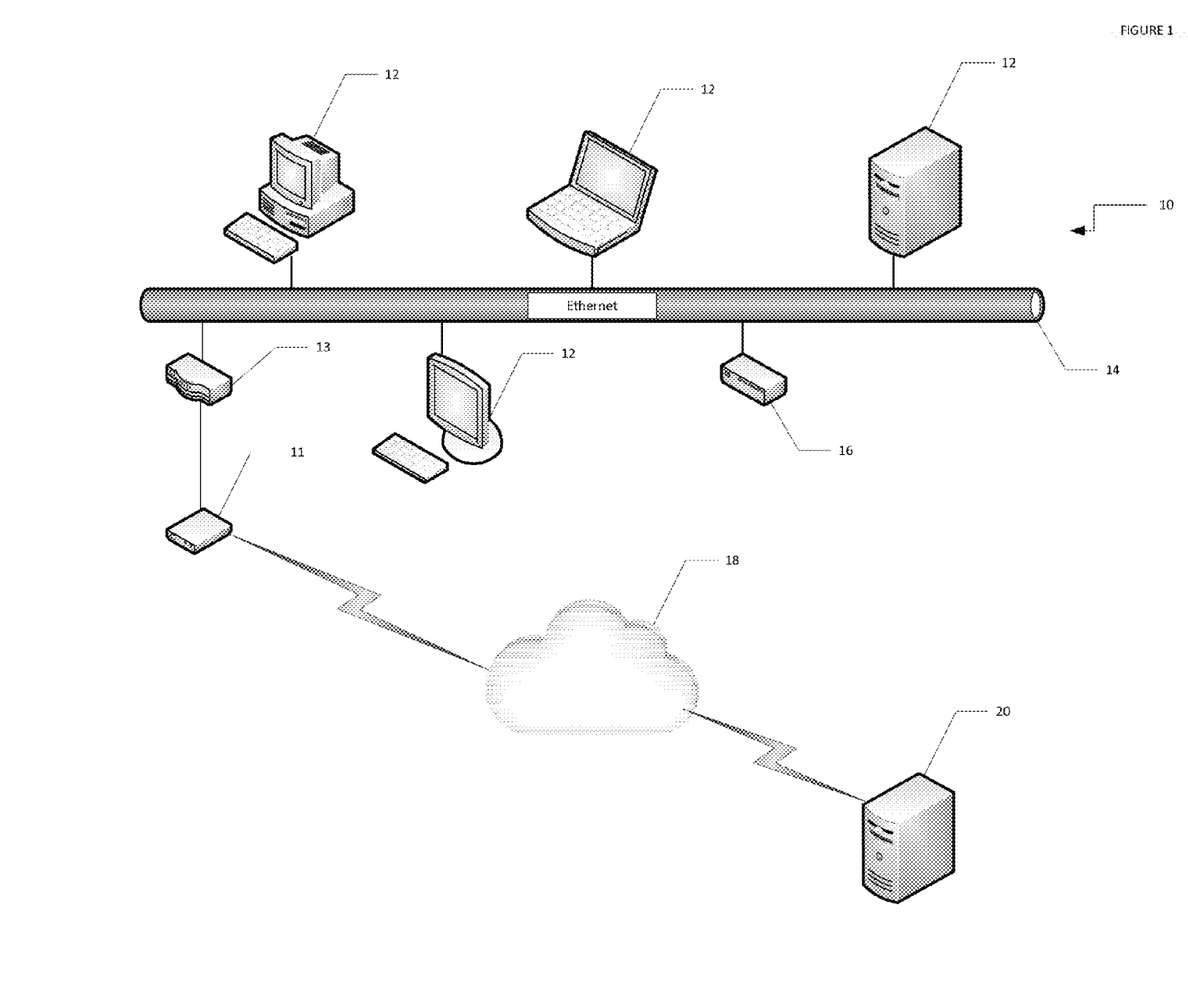
FIG. 1 is a block diagram depicting one example of a local area network with a monitoring station connected to a central server through the Internet.

FIG. 1 is a block diagram depicting one example of a local computer network in the form of a local area network (LAN) 10 that interconnects, through an Ethernet 14, a series of local network devices 12 in a limited area, such as a home, school or office building. The network devices can include, for example, computers, printers, scanners, DVD players, power strips and any other kind of IP addressable device. The network devices also include Internet connection equipment, such as a modem 11 and a router 13.

The method and system use at least one remote unit termed a monitoring station 16, which is a client device that is connected to the local computer network 10 being monitored, and a centralized server 20 which receives local network device status updates and configuration requests from the monitoring station 16. The monitoring station 16 and the central server 20 are capable of communication with one another over the Internet 18. The monitoring station is capable of Internet and network monitoring and power cycling actions autonomously, without the necessity of an active connection to the central server. The monitoring station 16 consists of a central processing unit (CPU), a data storage device, a network device, and operating software.

The monitoring station 16 automatically queries the local network devices 12 via any compatible network protocol to determine the devices' network connectivity and latency. "Connectivity" can be defined as the ability of devices on a network to communicate over the network with other devices on the network. "Latency" relates to the time required for a signal to travel from one point on a network to another point on the network.

Figure 6:
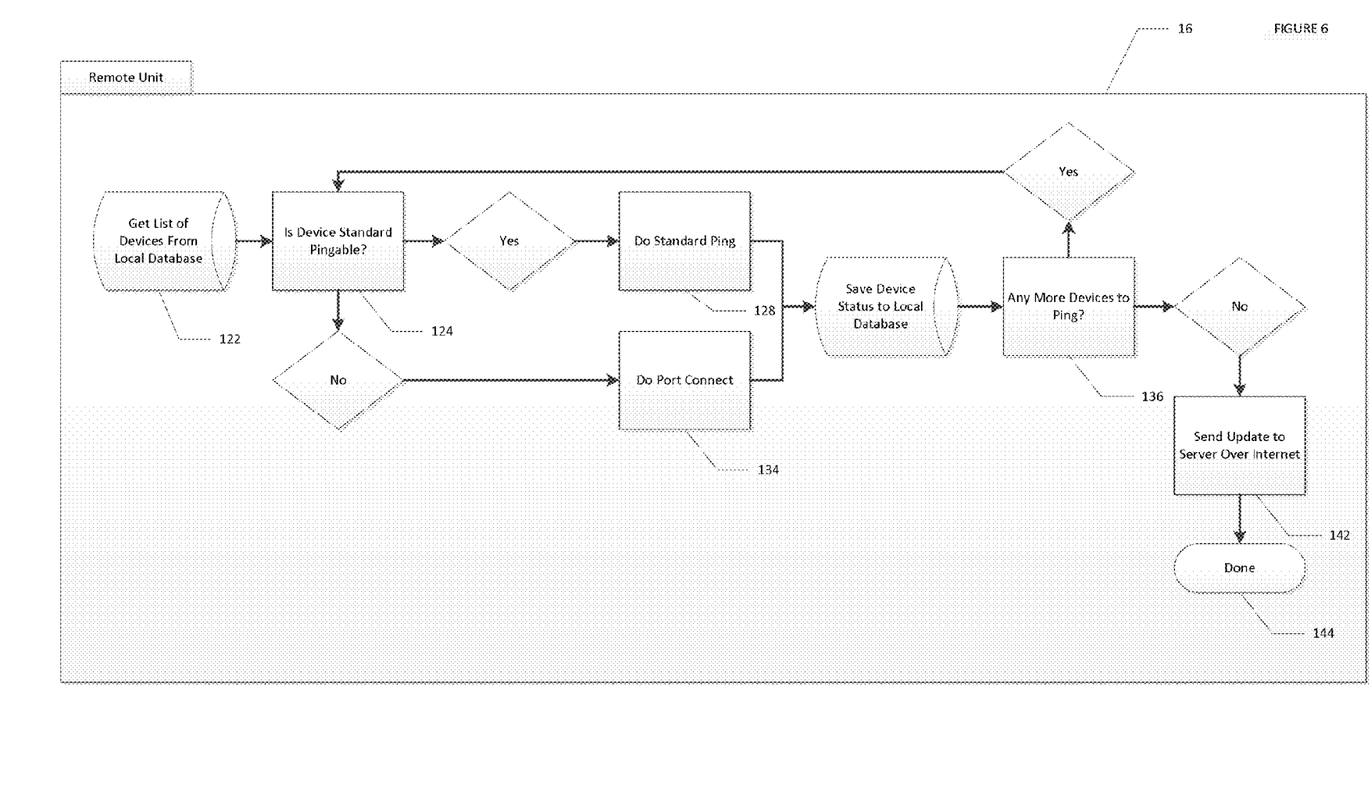
FIG. 6 depicts the steps taken by the monitoring station when it tests network devices to ascertain their status.

FIG. 6 depicts the steps taken by the monitoring station 16 when it tests network devices to ascertain their status. Thus, at step 122 in the flowchart shown in FIG. 6, the monitoring station 16 accesses a list of the network devices to be tested from its data storage. At step 124, the monitoring station 16 determines the test method to utilize for the devices on the network. The monitoring station then tests the devices on the network (steps 128 and 134). After the monitoring station determines that there are no more devices to test (step 136), at step 142 the monitoring station 16 sends an update to the central server 20 over the Internet via a network connection 18, whereupon it determines at step 144 that it is "done".

The monitoring station 16 typically tests local network devices 12 using standard pinging. One example of a "standard ping" would be an Internet Control Message Protocol (ICMP) ping. The monitoring station 16 can also test local network devices 12 which do not always respond to standard pings by attempting to establish TCP and UDP connections to specific ports, or make use of any compatible network protocol to communicate with the devices 12. "TCP" or "TCP/IP" (Transmission Control Protocol/Internet Protocol) is one of the core protocols of the Internet protocol suite, which is the networking model and a set of communication protocols used for the Internet and similar networks. "UDP" (User Datagram Protocol) is also one of the core members of the Internet protocol suite.

Figure 3:
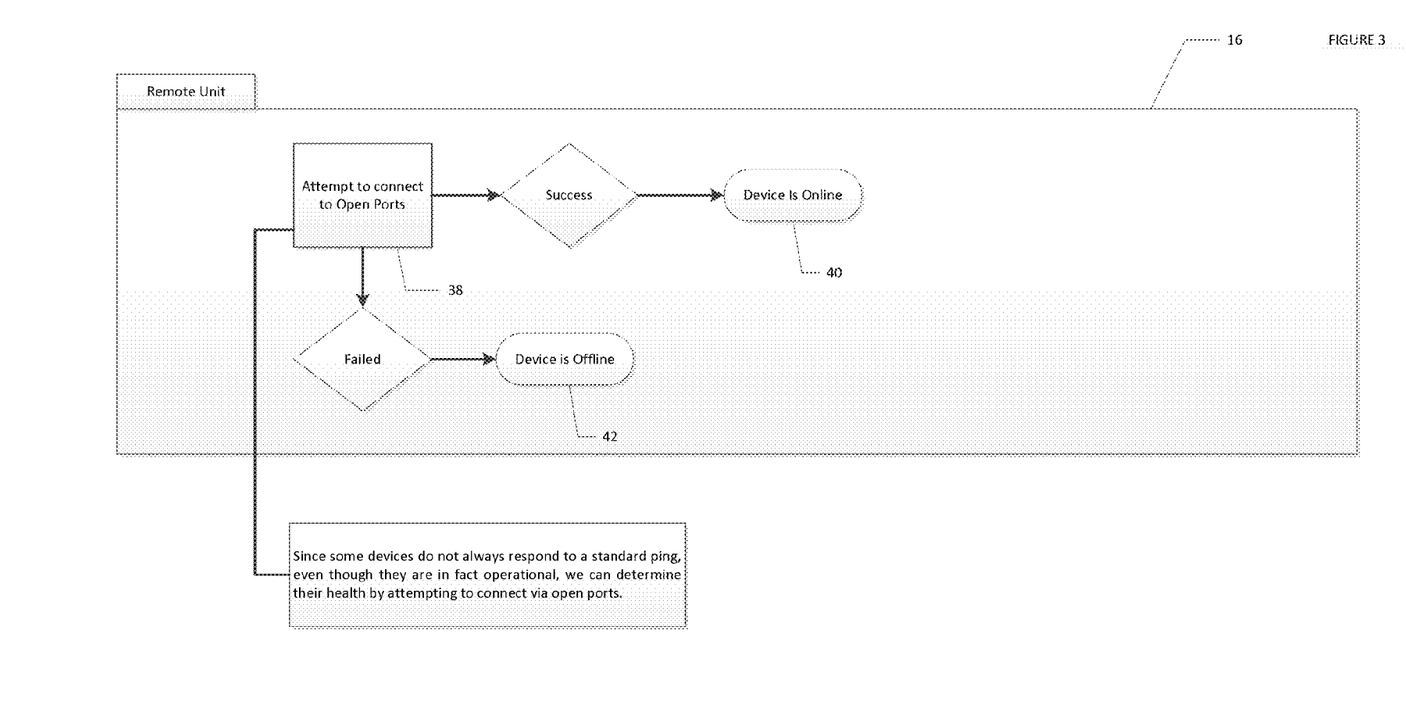
FIG. 3 depicts the steps taken by the monitoring station to determine the status of a network device being monitored that is not capable of responding to a standard ping.

Since some devices do not always respond to a standard ping, even though they are in fact operational, their operational status can be determined by attempting to connect to such a device via an open network port. FIG. 3 depicts the steps taken by the monitoring station 16 to determine via an open network port the status of a local network device being monitored. Thus, at step 38 of the flowchart shown in FIG. 3, the monitoring station 16 attempts to connect to a device's open network port. If it is successful in doing so, at step 40 of the flowchart, it concludes that the device is "online", so as to be capable of communicating with other devices on the network. If it is not successful in doing so, at step 42 of the flowchart, it concludes that the device is "offline", so as to not be capable of communicating with other devices on the network.

Figure 5:
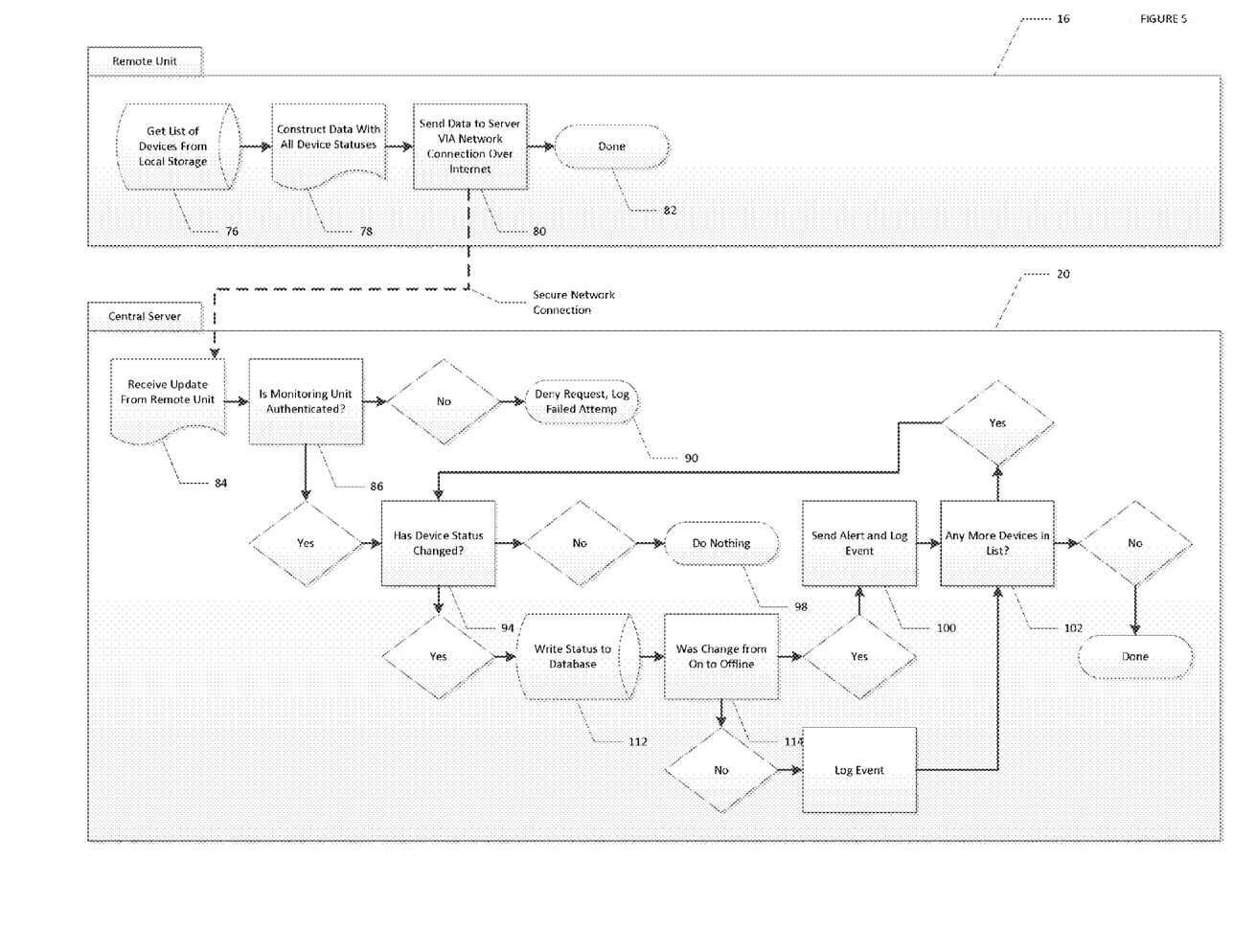
FIG. 5 depicts the steps taken by the monitoring station when it reports the statuses of the various network devices to the central server.

The monitoring station 16 reports local area network devices' statuses via a network connection back to the central server 20 at timed intervals. It should be obvious to one of skill in the art that this network connection would be preferentially encrypted, but such connections can occur without encryption. One example of encryption that might be used is HTTPS (or SSL connection). HTTPS (Hypertext Transfer Protocol Secure) is a variation of HTTP that provides for encryption of and transmission through a secure port, so as to allow HTTP to run over a security mechanism known as SSL (Secure Sockets Layer).

FIG. 5 depicts the steps taken by the monitoring station 16 when it reports the statuses of the various network devices to the central server 20. At step 76 of the flowchart shown in FIG. 5 the monitoring station first accesses a list of network devices from its storage. At step 78 it constructs a document or report with data that includes an update of the statuses of all of the devices on the local network 10. At step 80, the monitoring station 16 sends the data to the central server 20 via a network connection over the Internet 18, whereupon it determines at step 82 that it is "done".

When the central server receives the update from the monitoring station (step 84), it verifies the monitoring station's authentication (steps 86 and 90), determines and records the statuses of the local network devices (steps 94, 98 and 112), and generates notification alerts based on the status of each device (steps 114, 100 and 102).

The present invention also provides a method and system for remote, manually initiated power cycling of network devices 12 connected to compatible power distribution units, and commands to be executed by the monitoring unit. A power cycle or command is initiated from the central server 20, and is held in queue until the monitoring station 16 performs its synchronization request. If power cycles or commands are queued, they are included in the data response from the central server 20. The monitoring station 16 executes the power cycles or commands as part of its synchronization routine.

Figure 4:
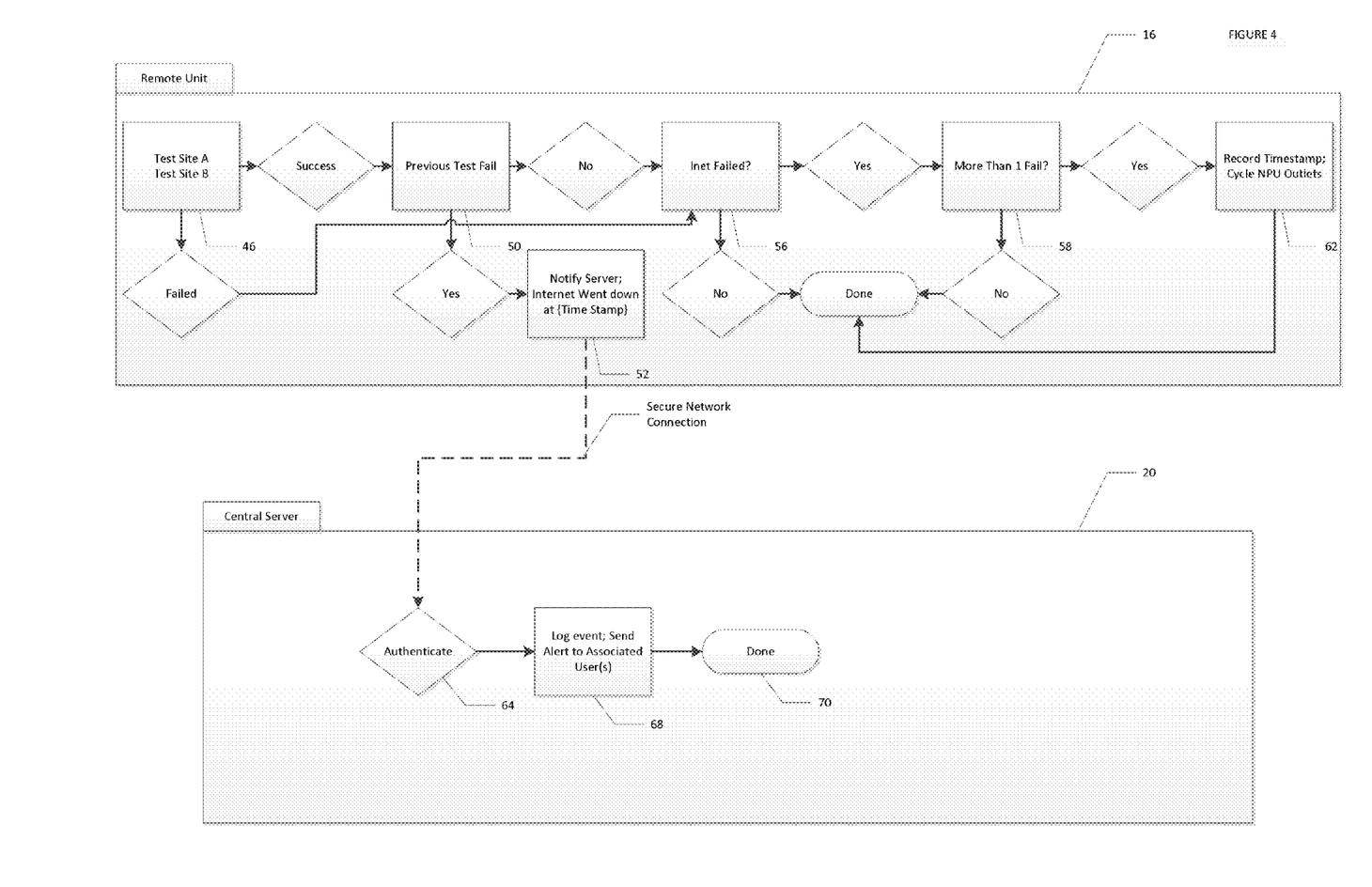
FIG. 4 depicts an attempt by the monitoring station to connect to various Internet sites to determine Internet connectivity and Internet latency and perform a power-cycling of the Internet connection equipment if necessary.

FIG. 4 depicts testing by the monitoring station of various Internet sites to determine Internet connectivity and Internet latency and the performance by the monitoring station 16 of power-cycling of Internet connection equipment. The monitoring station 16 also attempts network connection to various Internet sites to determine Internet connectivity and Internet latency (step 46). If the monitoring station 16 determines that Internet connectivity has been lost (steps 50, 56 and 58), the monitoring station power-cycles the Internet connection equipment, via a command to a network power unit or units (step 62). If the monitoring station detects an abnormally high Internet latency from multiple Internet sites, the monitoring station reports a high-latency alert to the central server 20 via a network connection. If the monitoring station 16 determines that Internet connectivity has been regained, after being lost, the monitoring station reports the time and duration of the lost connectivity back to the central server 20 via a network connection.

The monitoring station 16 may provide a graphical system status overview to a customer on the local network 10, with provisions for the customer to initiate power cycling of local devices 12. The monitoring station 16 may provide a graphical system status overview to the customer with current and historical data and statuses reported by the monitoring station.

The monitoring station initiates a power cycle of Internet connection equipment after confirming a test failure. At least 2 consecutive failures are preferred to prevent false-positives (steps 56 and 58). Preferentially, the monitoring station attempts one power-cycle of the Internet connection equipment to prevent continued unnecessary power cycles. If the Internet connection equipment (such as a modem and a router) requires sequential power restoration, this can be programmed into the monitoring station's software.

Conversely, if all tests are successful, the monitoring station determines if the Internet connection has just recovered from being offline. If it has, then at step 52 the monitoring station 16 notifies the central server 20 that the Internet went down at a particular time, which is recorded by the central server.

When the central server receives a notification from the monitoring station that the Internet connection went offline at a specified time, after authenticating the remote unit at step 64, at step 68 it logs the event and generates an alert to associated user(s), after which it determines at step 70 that it is "done".

The monitoring station 16 initializes itself automatically when first powered-up by sending its unique identifier via a network connection (preferentially secure) to the central server 20, which then responds via the network connection with configuration parameters to the monitoring station 16.

Figure 2:
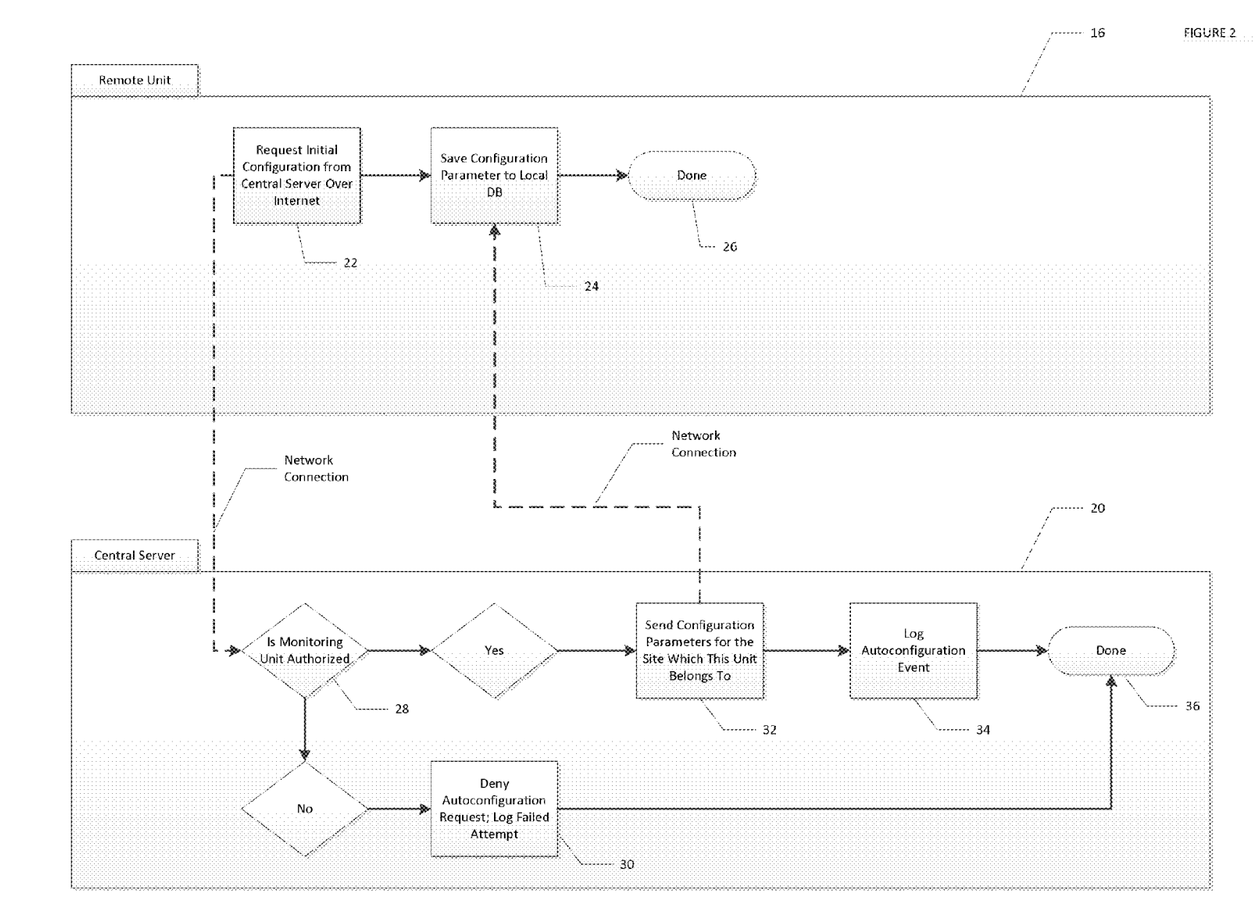
FIG. 2 is a flow chart depicting the steps taken by the monitoring station to request an initial configuration from the central server over the Internet via a network connection.

In FIG. 2, the monitoring station 16, at step 22 of the flowchart, requests an initial configuration from the central server 20 over the Internet 18 via a network connection (preferentially encrypted). At steps 28 of and 30 the flowchart, the central server 20 determines whether or not the unique identifier of the monitoring station 16 is authorized to connect to the central server. If the central server 20 determines that the remote unit is authorized to connect to the central server, it sends, at step 32, via a network connection, the authentication credentials and configuration parameters for the site to which the monitoring station 16 belongs. Thereafter, at step 34, the central server 20 logs this auto-configuration event, whereupon at step 36 the central server 20 determines that it is "done". When the monitoring station 16 receives the authentication and configuration parameters from the central server 20, the remote unit, at step 24, saves the parameters locally, whereupon it determines at step 26 that it is "done".

The monitoring station 16 synchronizes itself with the central server 20 automatically by authenticating via a network connection at timed intervals. The central server 20 then responds via the network connection with configuration changes and queued commands to be applied by the monitoring station 16 to the local network devices 12.

Figure 8:
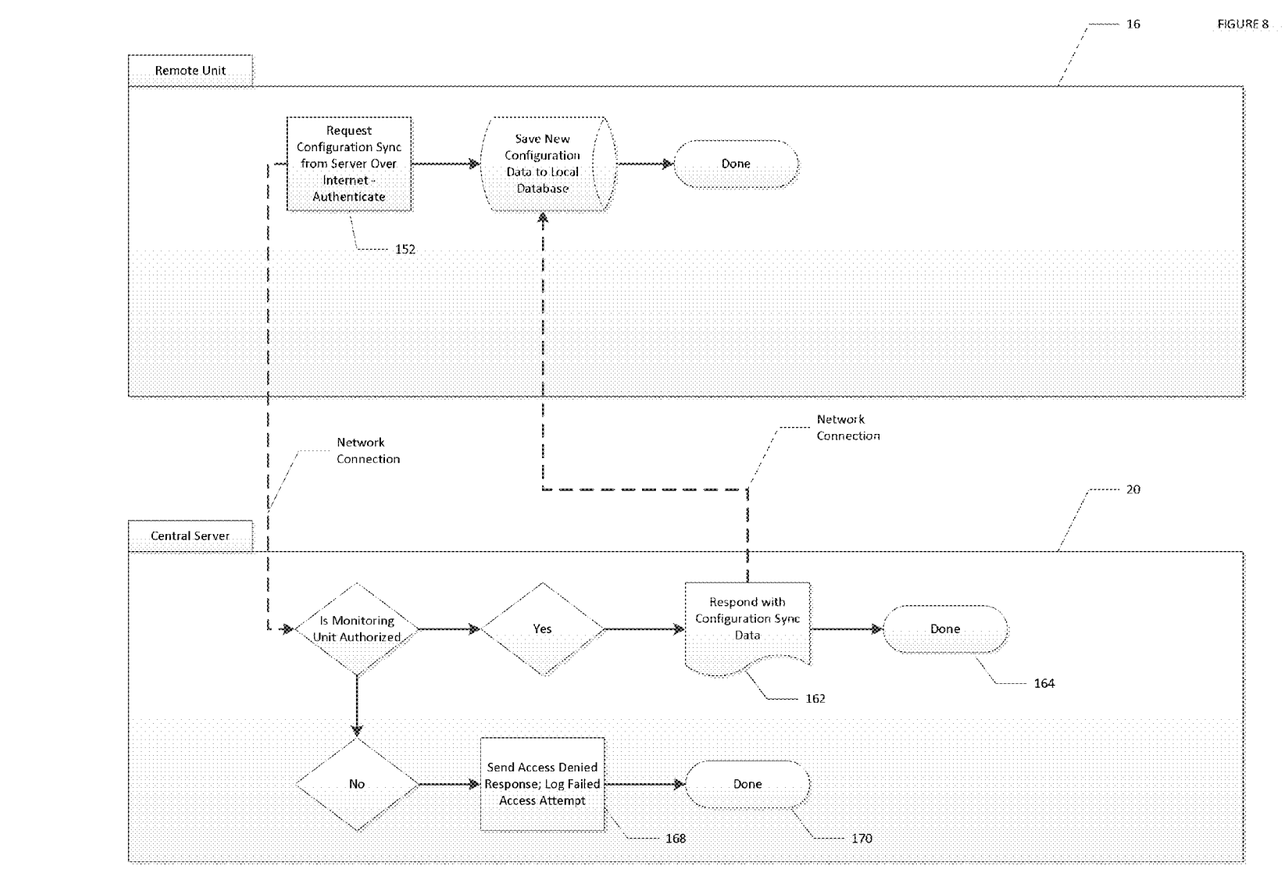
FIG. 8 is a flowchart showing the steps which the monitoring station and the central server perform to update the monitoring station's local configuration.

FIG. 8 is a flowchart showing the steps which the monitoring station 16 and the central server 20 perform to synchronize themselves to one another. At step 152, the monitoring station 16 requests from the central server 20 configuration synchronization. At step 158, the central server 20 determines whether the monitoring station 16 is authorized. If the central server determines that it is not, at step 168 it sends to the monitoring station 16 an "access denied" response and logs a failed access attempt, whereupon it determines at step 170 that it is "done". Conversely, if the central server 20 determines the monitoring station 16 is authorized, then at step 162 the central server sends configuration synchronization data to the monitoring station 16, whereupon at step 164 the central server 20 determines that it is "done".

When the central server 20 receives "exceptions" from the monitoring station 16, the central server 20 generates an alert to be sent to an operator. Exceptions can include (i) a device 12 on the monitoring station's local network 10 that was online, and is now offline; (ii) the Internet 18 is down; (iii) a device 12 on the local network 10 has high latency; (iv) the Internet 18 has high latency, or (v) any other event of interest. An alert is also generated and sent to the operator if the central server 20 receives no communication from the monitoring station 16 after a specified period of time. In this situation, a presumption is made that (i) Internet connectivity of the monitoring station's local network has been lost and could not be re-established, (ii) power is out, or (iii) the monitoring station 16 has failed, etc.

The monitoring station 16 also queries network-based systems for the status of their components, via the systems' own status reporting methods, and reports the statuses back to the central server 20. When the central server 20 receives system status alerts from the monitoring station 16 (e.g., devices down, system exceptions), the central server 20 generates and sends an alert to an operator.

The central server 20 may provide a graphical user interface to the service provider for site monitoring, configuration and customer management. The monitoring station 16 may provide a graphical system status overview to the user on the local network, with provisions for the user to initiate immediate power cycling of local devices.

To ensure network security, only outbound connections are made from the monitoring station 16 to the central server 20. The central server 20 does not require direct access to the local network 10 on which the monitoring station 16 operates. The monitoring station automatically queries devices which are capable of communicating via standard network protocols to determine their connectivity and latency (not limited to ICMP ping, TCP or UDP connection, etc.)

Figure 7:
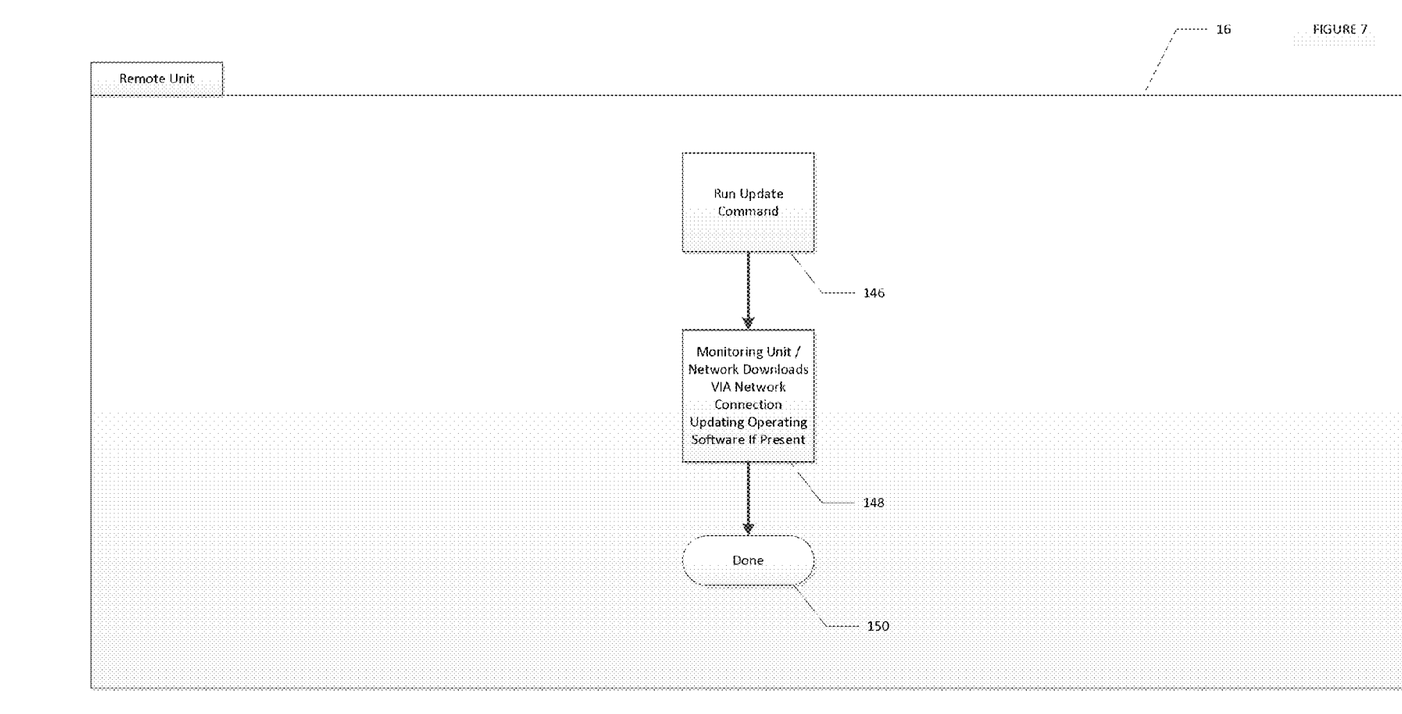
FIG. 7 is a flowchart showing the steps which the monitoring station performs to periodically update its operating software.

FIG. 7 is a flowchart showing the steps 146, 148 and 150 which the monitoring station 16 performs to periodically update its local operating software. The monitoring station checks the central server, and updates local files if a newer revision is present.

As discussed above, the monitoring station 16 automatically queries the local network devices 12 to determine such devices' local network connectivity and latency, and then reports such devices' status back to the central server 20 at timed intervals. As also discussed above, the monitoring station 16 synchronizes itself with the central server 20 automatically by authenticating with the central server 20 at timed intervals, after which the central server responds to the monitoring station 16.

Figure 9:
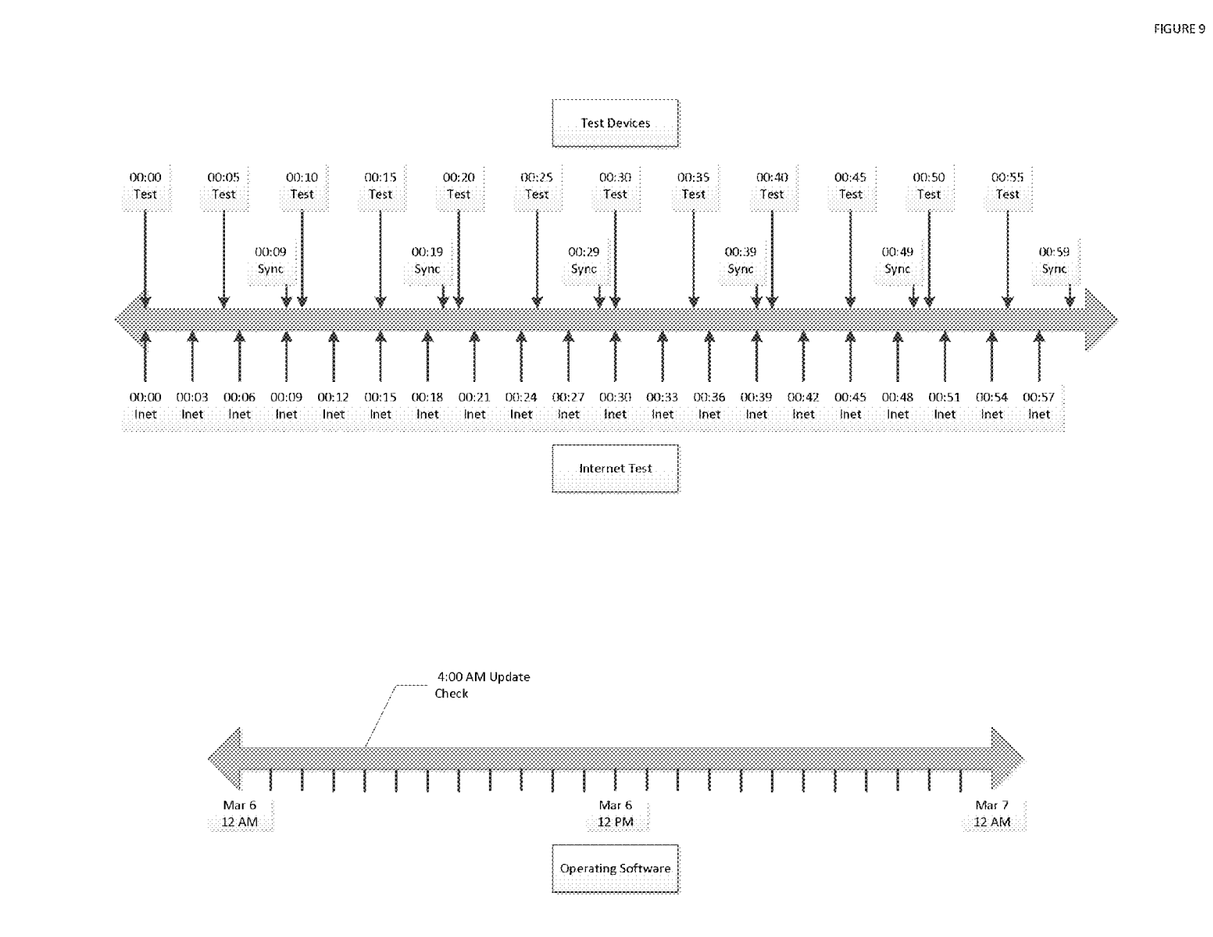
FIG. 9 is an example of a timing diagram showing a series of test events performed by the monitoring station with respect to the local network devices when determining their statuses, and a series of "sync" events performed by the monitoring station with respect to the central server.

FIG. 9 depicts an example of a timing diagram showing a series of "test" events performed by the monitoring station 16 with respect to the al least one local network devices 12 when determining their statuses, and a series of "synchronizing" events performed by the monitoring station 16 with respect to the central server 20. Also shown in FIG. 9 are a series of "Internet connectivity test" events which are performed by the monitoring station. A further timing diagram is shown in FIG. 9 that relates to the timing at which the "monitoring station" 16 periodically runs an update check as described with respect to FIG. 7 discussed above.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of monitoring a local computer network's Internet connectivity and status of at least one network device connected to the local computer network, the method comprising:

providing a monitoring unit connected to the local computer network for monitoring the local computer network's Internet connectivity and the status of the at least one network device connected to the local computer network, providing a remote server not connected to the local computer network, the monitoring unit being capable of reporting information to and requesting information from the remote server over the Internet, the remote server being only capable of responding to requests from the monitoring unit over the Internet, providing at least one power distribution unit to the at least one network device connected to the local computer network that can be detected and power-cycled off and then on by the monitoring unit, having the monitoring unit query the at least one local network device using a network protocol compatible with the local computer network to determine the status of the at least one network device, where the monitoring unit determines that the at least one network device is no longer detectable on the local network, having the monitoring unit power-cycle the at least one network device to attempt to bring the at least one network device back on-line on the local computer network, having the monitoring unit report the at least one network device's status to the remote server over the Internet, having the monitoring unit query a predetermined number of Internet sites to determine Internet connectivity, where the monitoring unit determines that Internet connectivity has been lost due to not being able to connect a predetermined number of times to the predetermined number of Internet sites, having the monitoring unit power-cycle at least one power distribution unit of Internet connection equipment that connect the local computer network, and thereby the at least one network device to the Internet, having the monitoring unit, where the monitoring unit determines that Internet connectivity has been regained after being lost, report the Internet connectivity loss to the remote server, where the remote server receives a status trouble report from the monitoring unit, having the remote server generate and send an alert to an operator of the remote server regarding Internet connection status.

2. The method of claim 1, wherein the monitoring unit determines the status of the at least one network device by determining at least the local network connectivity of the at least one network device.

3. The method of claim 2, wherein the monitoring unit determines the status of the at least one network device by also determining the local computer network latency of the at least one network device.

4. The method of claim 1, wherein the monitoring unit automatically queries the at least one network device to determine such device's status and then reports the at least one local computer network device's status to the remote server at predetermined timed intervals.

5. The method of claim 1, wherein the monitoring unit queries the at least one network device via ping to determine the at least one network device's network status.

6. The method of claim 1, wherein the monitoring unit queries the at least one network device via any network protocol compatible with the local computer network to determine such at least one network device's status.

7. The method of claim 1, wherein the monitoring unit tests the network connectivity of the at least one network device when the at least one network device does not respond to standard ping methods by attempting to establish TCP and UDP connections to specific ports of such at least one network device.

8. The method of claim 1, wherein the monitoring unit reports the at least one network device's status to the remote server via a network connection.

9. The method of claim 1, wherein, when the monitoring unit determines that Internet connectivity has been regained after being lost, the monitoring unit reports the time and duration of the lost Internet connectivity to the remote server.

10. The method of claim 1, wherein the trouble report includes a report that the at least one network device is down, so as to have no local computer network connectivity, or an exception report.

11. The method of claim 10, wherein the exception report includes a report (i) that the local computer network device was up, so as to be on-line, but is now down, so as to be off-line and have no local network connectivity, (ii) that the Internet connection is down; (iii) that the local computer network device has latency that exceeds the normal latency for the local computer network, or that the Internet has latency from at least a plurality of Internet sites that exceeds the normal Internet latency.

12. The method of claim 1, wherein the method further comprises, when the remote server receives no communication from the monitoring unit after a predetermined period of time, the remote server generating and sending an alert to an operator.

13. The method of claim 1, wherein the method further comprises the monitoring unit initializing itself automatically when first powered-up by sending the monitoring unit's unique identifier via encrypted network connection to the remote server, and the remote server then responding via that connection with configuration parameters to the monitoring unit.

14. The method of claim 1, wherein the monitoring unit is comprised of a central processing unit (CPU), a data storage device, a network device, and operating software.

15. The method of claim 1, wherein the method further comprises initiating commands from the remote server to the monitoring unit and power cyclings of the at least one network device's power distribution unit(s) by the monitoring unit from a graphical interface of the remote server, and the commands being held in queue until the monitoring unit performs a synchronization request to the remote server.

16. The method of claim 15, wherein the method further comprises the steps of where power cycles or commands are queued, the power cycles or commands are included in a response from the remote server to the monitoring unit, such that the monitoring unit executes the power cycles or commands as part of the monitoring unit's synchronization routine.

17. The method of claim 1 further comprising the remote server providing a graphical user interface to a service provider operating the remote server and monitoring unit for site monitoring, configuration and customer management.

18. The method of claim 1 further comprising the monitoring unit providing a graphical system status overview to a customer using the monitoring unit on the local computer network, with provisions for the customer to initiate power cycling of the customer's local device(s).

19. A method of monitoring a local computer network's Internet connectivity and status of at least one network device connected to the local computer network, the method comprising:

providing a monitoring unit connected to the local computer network for monitoring the status of the at least one network device connected to the local computer network, providing a remote server not connected to the local computer network, the monitoring unit being capable of reporting information to and requesting information from the remote server over the Internet, the remote server being only capable of responding to requests from the monitoring unit over the Internet, providing at least one power distribution unit to the at least one network device connected to the local computer network that can be detected and power-cycled off and then on by the monitoring unit, having the monitoring unit query the at least one local network device using a network protocol compatible with the local computer network to determine the status of the at least one network device, where the monitoring unit determines that the at least one network device is no longer detectable on the local network, having the monitoring unit power-cycle the at least one network device to attempt to bring the at least one network device back on-line on the local computer network, having the monitoring unit report the at least one network device's status to the remote server over the Internet, having the monitoring unit query a predetermined number of Internet sites to determine Internet connectivity, where the monitoring unit determines that Internet connectivity has been lost due to not being able to connect a predetermined number of times to the predetermined number of Internet sites, having the monitoring unit power-cycle at least one power distribution unit of Internet connection equipment that connects the local computer network and thereby the at least one network device to the Internet, having the monitoring unit, where the monitoring unit determines that Internet connectivity has been regained after being lost, report the Internet connectivity loss to the remote server, where the remote server receives a status trouble report from the monitoring unit, having the remote server generate and send an alert to an operator of the remote server regarding Internet connection status, and wherein the method further comprises the monitoring unit synchronizing itself with the remote server automatically by sending to the remote server the monitoring unit's authentication credentials via a network connection at predetermined timed intervals, and the remote server then responding to the monitoring unit via the encrypted network connection with configuration changes and queued commands to be applied by the monitoring unit to the at least one network device.

20. A system for remotely monitoring a local computer network's Internet connectivity and status of at least one network device connected to the local computer network, the system comprising:
   a monitoring unit connected to the local computer network for monitoring the local computer network's Internet connectivity and the status of the at least one device connected to the local computer network, and
   a server not connected to the local computer network, the monitoring unit being capable of reporting information to and requesting information from the server over the Internet, the server being only capable of responding to requests from the monitoring unit over the Internet,
   the monitoring unit being programmed to:
      (i) query the at least one network device using a network protocol compatible with the local computer network to determine the status of the at least one network device,
      (ii) report the at least one network device's status to the server,
      (iii) query a predetermined number of Internet sites to determine Internet connectivity,
      (iv) where the monitoring unit determines that Internet connectivity has been lost due to not being able to connect a predetermined number of times to the predetermined number of Internet sites, having the monitoring unit power-cycle at least one Internet connection power distribution unit of Internet connection equipment that connects the local computer network and thereby the at least one network device to the Internet, and
      (v) having the monitoring unit where the monitoring unit determines that Internet connectivity has been regained after being lost, report the Internet connectivity loss to the server, the server being programmed, when the server receives a trouble report from the monitoring unit to generate and send an alert to an operator of the server.

21. The system of claim 20, wherein the monitoring unit determines the status of the at least one network device by determining at least the local network connectivity of the at least one network device.

22. The system of claim 21, wherein the monitoring unit determines the status of the at least one network device by also determining the local network latency of the at least one network device.

23. The system of claim 20, wherein the monitoring unit automatically queries the at least one network device to determine the at least one network device's status and then reports the at least one network device's status to the server at predetermined timed intervals.

24. The system of claim 20, wherein the monitoring unit queries the at least one network device via ping to determine the at least one network device's network status.

25. The system of claim 20, wherein the monitoring unit queries the at least one network device via any network protocol compatible with the local computer network to determine the at least one network device's status.

26. The system of claim 20, wherein the monitoring unit pings the at least one network device which does not respond to standard ping methods by attempting to establish TCP and UDP connections to specific ports of the at least one network device.

27. The system of claim 20, wherein the monitoring unit reports the at least one network device's status to the server via network connection.

28. The system of claim 20, wherein the trouble report includes a report that the at least one network device is down, so as to be off-line and have no local network connectivity, or an exception report.

29. The system of claim 28, wherein the exception report includes a report (i) that the local computer network device was up, so as to be on-line and have local network connectivity, but is now down, so as to be off-line, so as to have no local network connectivity, (ii) that the Internet is down; (iii) that the local computer network device has latency that exceeds the normal latency for the network, or that the Internet has latency from at least a plurality of Internet sites that exceeds the normal Internet latency.

30. The system of claim 20, wherein the monitoring unit is comprised of a central processing unit (CPU), a data storage device, a network device, and operating software.

31. The system of claim 20, wherein the server provides a graphical user interface to a service provider operating the server and monitoring unit for site monitoring, configuration and customer management.

32. The system of claim 20, wherein the monitoring unit provides a graphical system status overview to a customer using the monitoring unit on the local computer network, with provisions for the customer to initiate immediate power cycling of the customer's at least one network device.

33. The system of claim 20, wherein to ensure local computer network security, only outbound connections are made from the monitoring unit to the server, such that the server does not have direct access to the local computer network on which the monitoring unit operates.

* * * * *